United States Patent [19]

Weimer et al.

[11] Patent Number: 4,515,447

[45] Date of Patent: May 7, 1985

[54] OPTICAL ADJUSTMENT DEVICE

[75] Inventors: Eugen Weimer, Essingen; Gerhard Müller, Aalen, both of Fed. Rep. of Germany

[73] Assignee: Carl-Zeiss-Stiftung, Heidenheim on the Brenz, Fed. Rep. of Germany

[21] Appl. No.: 485,213

[22] Filed: Apr. 15, 1983

[30] Foreign Application Priority Data

Apr. 17, 1982 [DE] Fed. Rep. of Germany ....... 3214268

[51] Int. Cl.³ .......................... G02B 27/12; G02B 7/18; G02B 27/17
[52] U.S. Cl. .................................... 350/527; 350/6.4; 350/287
[58] Field of Search ........................ 350/527, 523–526, 350/6.4, 484, 287; 351/221, 233

[56] References Cited

U.S. PATENT DOCUMENTS

| | | | |
|---|---|---|---|
| 3,704,949 | 12/1972 | Thomas et al. | 350/484 |
| 3,736,848 | 6/1973 | Tsuneta et al. | 350/6.4 |
| 3,752,559 | 8/1973 | Fletcher et al. | 350/505 |
| 3,776,995 | 12/1973 | Little | 350/484 |

*Primary Examiner*—Jon W. Henry
*Attorney, Agent, or Firm*—Stonebraker, Shepard & Stephens

[57] ABSTRACT

Two embodiments of an adjusting device for correcting misalignment in optical ray paths are disclosed. The first embodiment (FIGS. 1 and 3) has two transparent plane plates (21, 22) which are tilted relative to the optical axis and are supported with their mounts (35, 36) for rotation with constant angle of inclination around the optical axis in a tube (37) which is developed as an intermediate structure mountable in a desired location in an optical system. The second embodiment (FIGS. 2 and 5) has two wedge prisms which are displaceable with respect to each other along the optical axis and which can be turned jointly around the optical axis. Both embodiments are useful upon the coupling of a laser beam into a microscope in order to compensate for beam misalignment of the laser, the axis of which is subject to slow drift during operation.

11 Claims, 5 Drawing Figures

OPTICAL ADJUSTMENT DEVICE

BACKGROUND OF THE INVENTION

The present invention relates to optical adjustment elements and their use for the precise concentric coupling of a monochromatic parallel beam of rays into an optical microscope. Two different but closely related forms of adjusting elements are disclosed.

For the intense punctiform illumination of microscopic specimens for photometric or spectroscopic examinations, for instance for the selective excitation of individual regions of the specimen for fluorescence or Raman analysis, it is already known to couple a laser beam into the illuminating system of an optical microscope which is focused, limited in refraction by the objective of the microscope, to a diameter of about 1 um in the object plane.

With such an arrangement, the optical axes of the microscope and the additional laser illuminating device must agree precisely. Lack of alignment of the axes leads to non-uniform illumination of the pupil of the objective, which makes itself perceptible in an undesired fanning out of the focus of the laser in the object plane.

During the operation of the laser, however, displacements and tiltings of the laser beam by small amounts take place in the course of a slow drift. The lack of alignment of the expansion optical system generally used which is arranged behind the laser is further increased by the expansion factor. It is thus necessary to provide adjustment means to compensate for the lack of alignment and the tilting of the laser beam with respect to the optical axis of the microscope.

As adjustment means for tilting of the axis, use may be made in known manner of deflection mirrors which are in any event possibly present in the path of the beam. However, it must be borne in mind that such adjustment mirrors as a rule introduce an additional defect in alignment, since the plane of the mirror, the axis of tilt of the mirror, and the optical axis of the laser do not always intersect precisely at one point.

From German Pat. No. 720,904, published May 19, 1942, it is furthermore known to use transparent wedges which are turnable independently of each other around the optical axis in order to adjust for tilting of the axis.

As adjustment means for parallel misalignment, it is possible to use so-called parallel-plate micrometers consisting of two plates of glass with planoparallel surfaces, the inclination of which can be varied with respect to the optical axis. Such an arrangement is disclosed in West German Pat. No. 1,094,485, published Dec. 8, 1960. Such an adjusting device has, however, the disadvantages that, on one hand, the transmission of the plates, even with extensive elimination of reflections, is dependent on angle, and that, furthermore, the adjustment mechanism, which possibly must contain a step-down gearing for fine adjustments, is relatively expensive.

The object of the present invention is to create an optical adjustment element for axial misalignment which is of relatively simple and inexpensive construction, and is convenient to handle.

SUMMARY OF THE INVENTION

This object is achieved by providing a construction in accordance with either one or two closely related embodiments described below.

The first solution provides two plane-parallel plates which are inclined at a fixed angle to the optical axis and are preferably provided on both sides with a reflection-eliminating coating in order to prevent undesired reflections. This arrangement has the advantage that there are no plane surfaces directed perpendicular to the optical axis, as in the case of so-called parallel-plate micrometers in the middle position. Thus disturbing interferences as a result of light reflected back on the axis are avoided.

The second solution provides two wedges which are displaceable with respect to each other and can be turned in common around the optical axis. In this solution, however, two of four surfaces are permanently inclined to the optical axis.

The two solutions have, in common, the advantage of the constant angle of the glass-air boundary layers with respect to the optical axis. In this way, the adjustment process is prevented from causing a change in the transmitted light intensity. In both cases, furthermore, the mounting and guiding of the individual optical elements (plates or wedges) can be effected in very simple fashion by rings which are inserted one within the other, in tube guide fashion. Further advantageous developments of the invention are described below.

DESCRIPTION OF THE PREFERRED EMBODIMENTS

Figure 1:
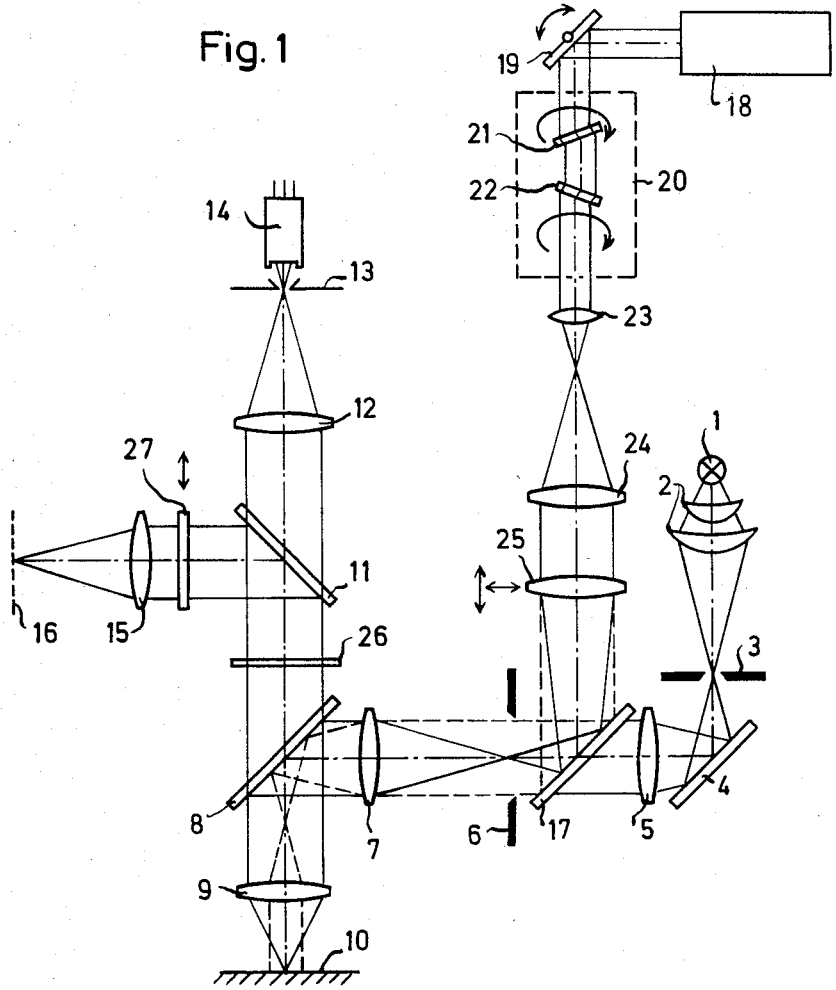
FIG. 1 shows the basic diagram of a reflected-light fluorescence microscope with laser excitation and with an adjusting device (20) according to the first embodiment.

The illuminating system shown in FIG. 1 for a reflected-light fluorescence microscope contains, in traditional arrangement, a soure of light 1 which is focused by a collector 2 into the plane of the aperture diaphragm 3. This is followed by a deflection mirror 4, a lens 5 for illuminating the luminous field diaphragm 6, and another lens 7 for imaging the aperture diaphragm 3 in the back focal plane of the objective 9 after reflection by the semi-transmitting mirror 8.

The observation ray path comprises, in addition to the objective 9 for the focusing of the object plane 10, a switchable mirror 11 which, in one position, deflects the ray of light into the binocular tube where the intermediate image 16 offered the viewer is produced by means of the tube lens 15, or else in the other position, permits it to pass unimpeded to the lens 12. The tube lens 12 then produces the intermediate image in the plane of the photometer diaphragm 13 which is arranged in front of a photo-multiplier 14.

For the excitation of the fluorescence, there is used a helium-cadmium laser 18 whose beam is conducted via a mirror 19 which it tiltable for adjustment of the angle. The beam then passes through an adjustment device 20, the optically active parts of which consist of two rotatable elements in the form of plane plates 21, 22, for correction of misalignment. Behind them there is arranged an expansion optical system 23, 24. This is followed by a lens 25 which is displaceable in well-defined fashion in three directions in space and which focuses the laser beam, after reflection via the splitting mirror 17, in the plane of the luminous field diaphragm 6 and, on the basis of its displaceability, determines the position of the laser focus within the object laterally and in depth. At the same time the divergence of the laser radiation is adapted by the lens 25 to the illuminating optical system of the microscope. The focal length of the lens 25 is so selected that the pupil of the objective 9 is fully illuminated in order to obtain a refraction-limited focusing.

The lens 25 may be swung out of the path of the way. In that case, the laser beam, which is then focused in the focal plane of the objective, illuninates the object field in an area fashion.

In the observation ray path, a barrier filter 26 adapted to the wavelength of the laser 18 is arranged, as well as an eye-protection filter 27 which is swung by electrical control into the ray path as soon as the mirror 11 moves into the position shown in the drawing and the laser 18 is in operation. In this way injury to the observer by the intense laser focus formed on the retina is avoided.

When the beam leaving the laser 18 experiences a drift in the form of parallel misalignment during operation, this misalignment is increased by the ratio of the focal lengths of the lenses 24 and 23 and leads to an asymmetrical illuminating of the pupil of the objective 9. The result is a fanning of the laser focus in the object plane which is clearly perceptible to the observer.

Figure 3:
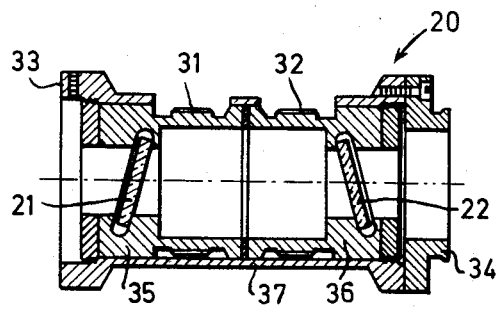
FIG. 3 is a diametrical section taken axially through the mount for the adjusting device 20 of FIG. 1.
Figure 4:
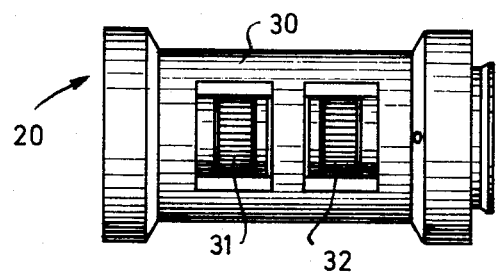
FIG. 4 is an elevational view of the mount of FIG. 3.

By rotating the knurled knobs 31 and 32 on the adjusting device 20, shown in detail in FIGS. 3 and 4, this disturbing misalignment is eliminated. Each of the two plates 21 and 22 which are arranged at an inclination in the tubes 35, 36 produces a constant displacement of the beam. This displacement is variable in direction due to the turntable support in the tubular housing 37. By use of the laws of vector addition, therefore, the laser beam can be adjusted within a circular range whose radius is equal to twice the displacement on a flat plate.

It will be apparent from FIGS. 3 and 4 that the tubes 35 and 36 which respectively carry the flat plates 21 and 22 are held against axial movement in the tubular housing 37 but they may be rotated within the housing by manually engaging the knurled portions 31 snd 32 where such portions are accessible through the cut-outs or windows shown in FIG. 4. In making an adjustment, the two tubes and their two flat plates may be rotated together (e.g., using two fingers simultaneously at the two windows of the housing 37) or they may be rotated independently of each other. At both ends of the tubular unit 20, there are suitable connecting means, such as a receiving socket and retaining screw 33 at one end and a dovetailed circular projection 34 at the other end, of standard or commonly used form, whereby the device may be connected with appropriate mating parts of an optical instrument with which the present device is to be used.

Figure 2:
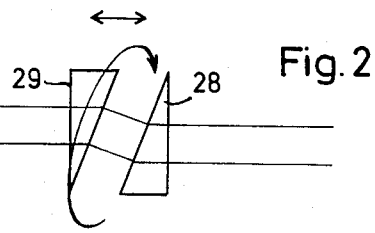
FIG. 2 shows the second or alternative embodiment of an adjusting device which may be used in place of the device shown at 20 in FIG. 1.
Figure 5:
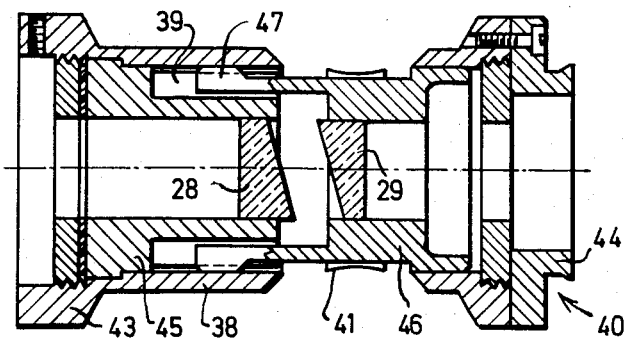
FIG. 5 is a sectional view similar to FIG. 3, illustrating the mount for the alternative adjusting device of FIG. 2.

In FIG. 2 two wedge prisms 28 and 29 are shown as an alternative adjustment device instead of the plane plates 21 and 22. By varying their axial distance apart, parallel misalignment can be compensated for in amount, while by the joint turning of the two prisms it can be compensated for in direction. For this purpose, the wedges 28 and 29 are combined to form a structural unit 40, which is shown in greater detail in FIG. 5.

In the same way as the adjusting element 20 of FIGS. 3 and 4, the structural unit 30 is provided with socket and dove-tail projecting portions 43 and 44 on the two ends of an annular housing 38. Within this housing 38 the support 45 for the wedge 28 is rotatable but secured against axial movement and the support 46 for the wedge 29 is guided in rotation and also axial translation. A knurled knob 41 on the support 46 is adapted to be shifted axially as well as turned by two fingers of one hand through cutouts in the tubular housing 38 which lie opposite each other. Arms 47 of the carrier 46 engage into the longitudinal grooves 39 of the support 45 so that the two tubular carriers 45 and 46 and their respective prisms 28 and 29 cannot rotate relative to each other, although they can both rotate together, and they can move longitudinally or axially relative to each other.

What is claimed is:

1. An optical adjustment device comprising two transparent parallel plates which are inclined relative to an optical axis, both of said plates (21, 22) being mounted for rotation around said optical axis with constant angle of inclination relative to said optical axis, and means for coupling a monochromatic parallel beam of rays into an optical microscope, said coupling means including an expansion lens system (23, 24) and a displaceable intermediate lens (25) which focuses the beam of rays in an image plane (6) which is conjugated to an object plane (10) of the microscope, said parallel plates being located in said beam of rays between a source thereof and said expansion lens system.

2. The invention defined in claim 1, wherein said intermediate lens (25) is mounted in such a manner that it can be swung out of the path of said beam of rays.

3. The invention defined in claim 1, further comprising a laser as a source of said beam, and an inclinable mirror (19) for adjusting the angle of the laser beam, said mirror being located in front of said expansion lens system (23, 24).

4. An optical microscope having an optical system including means forming an image plane conjugate to an object plane of the microscope and having coupling means for coupling a monochromatic parallel beam of rays into said optical system of said microscope, said coupling means comprising (a) an expansion lens system for expanding the diameter of said parallel beam of rays;
(b) a displaceable intermediate lens for focusing said beam of rays in said image plane; and
(c) an adjustment device for adjusting laterally the axis of said beam of rays relative to the axis of said optical system of the microscope;
(d) said adjustment device comprising two transparent parallel plates interposed in said beam and inclined relative to the axis of said beam and being mounted for rotation around said axis of said beam with constant angle of inclination.

5. The invention defined in claim 4, further comprising a tube concentric relative to said beam axis, and mounting members movable within and guided by said tube, said plates being mounted on said mounting members.

6. An optical microscope having an optical system including means forming an image plane conjugate to an object plane of the microscope and having coupling means for coupling a monochromatic parallel beam of rays into said optical system of said microscope, said coupling means comprising
   (a) an expansion lens system for expanding the diameter of said parallel beam of rays;
   (b) a displaceable intermediate lens for focusing said beam of rays in said image plane; and
   (c) an adjustment device for adjusting laterally the axis of said beam of rays relative to the axis of said optical system of the microscope;
   (d) said adjustment device comprising two transparent members interposed in said beam, each member having at least one surface inclined relative to the axis of said beam, both of said members being mounted for rotation around said axis of said beam with constant angle of inclination of said inclined surface relative to said axis.

7. The invention defined in claim 6, wherein said two transparent members are plates having opposite surfaces parallel to each other, said plates being rotatable relative to each other.

8. The invention defined in claim 6, wherein said two transparent members are wedges with taper in opposite diametrical directions, and are mounted for conjoint rotation and for axial adjusting movement relative to each other.

9. The invention defined in claim 8, further comprising a tube concentric relative to said beam axis, and mounting members movable within and guided by said tube, said wedges being mounted on said mounting members.

10. The invention defined in claim 9, wherein there are two of said mounting members, both of which are guided for rotation within said tube and only one of which is guided for axial movement within said tube, the other of said mounting members being held against axial movement.

11. The invention defined in claim 6, further comprising a laser as a source of said beam, and an inclinable mirror (19) for adjusting the angle of the laser beam, said mirror being located in front of said expansion lens system (23, 24).

* * * * *